United States Patent [19]
Yoshiji et al.

[11] Patent Number: 5,839,532
[45] Date of Patent: Nov. 24, 1998

[54] VACUUM WALL WALKING APPARATUS

[75] Inventors: Takeo Yoshiji; Kuniaki Okuma, both of Sayama, Japan

[73] Assignee: Honda Giken Kogyo Kabushiki Kaisha, Tokyo, Japan

[21] Appl. No.: 620,018

[22] Filed: Mar. 21, 1996

[30]     Foreign Application Priority Data

Mar. 22, 1995 [JP] Japan .................................. 7-063232
Mar. 23, 1995 [JP] Japan .................................. 7-063787
Mar. 23, 1995 [JP] Japan .................................. 7-063788

[51] Int. Cl.$^6$ .............................. B60B 39/00; B25J 5/00; B63B 9/00; B62D 51/06
[52] U.S. Cl. ......................... 180/164; 180/901; 182/142; 187/239; 187/245; 114/222
[58] Field of Search ................... 180/164, 901, 180/8.1, 8.6, 8.5; 901/1, 22, 41; 451/91, 92, 354, 456, 87; 248/205.5–206.4, 363; 15/98; 114/222; 318/568.12, 568.1, 568.16, 568.2; 182/142, 48; 187/401, 413

[56]           References Cited

U.S. PATENT DOCUMENTS

| | | | |
|---|---|---|---|
| 3,810,515 | 5/1974 | Ingro | 180/164 |
| 3,958,652 | 5/1976 | Urakami et al. | 180/901 |
| 4,095,378 | 6/1978 | Urakami | 180/901 |
| 4,199,905 | 4/1980 | Neidigh et al. | 180/901 |
| 4,330,865 | 5/1982 | Hyd et al. | 180/901 |
| 4,664,212 | 5/1987 | Nagatsuka et al. | 180/901 |
| 4,666,114 | 5/1987 | Kroczynski et al. | 248/205.6 |
| 4,674,949 | 6/1987 | Kroczynski | 901/1 |
| 4,688,289 | 8/1987 | Urakami | 451/354 |
| 4,940,382 | 7/1990 | Castelaih et al. | 901/1 |
| 4,993,913 | 2/1991 | Ohtsuki | 901/1 |
| 4,997,052 | 3/1991 | Urakami | 451/456 |
| 5,014,803 | 5/1991 | Urakami | 451/456 |
| 5,077,510 | 12/1991 | Collie | 901/15 |
| 5,161,631 | 11/1992 | Urakami | 180/901 |
| 5,351,626 | 10/1994 | Yanagisawa | 180/164 |
| 5,351,773 | 10/1994 | Yanagisawa | 901/1 |
| 5,487,440 | 1/1996 | Seemann | 180/901 |
| 5,536,199 | 7/1996 | Urakami | 451/456 |
| 5,551,525 | 9/1996 | Pack et al. | 180/901 |
| 5,575,346 | 11/1996 | Yberle | 901/1 |
| 5,592,998 | 1/1997 | Urakami | 180/164 |

FOREIGN PATENT DOCUMENTS

| | | | |
|---|---|---|---|
| 0391441 | 10/1990 | European Pat. Off. | 451/354 |
| 60-176869 | 9/1985 | Japan | 180/901 |
| 62-279176 | 12/1987 | Japan | 180/164 |
| 1-36586 | 2/1989 | Japan | 180/901 |
| 1-36587 | 2/1989 | Japan | 180/901 |
| 1-36588 | 2/1989 | Japan | 180/901 |
| 3-581 | 1/1991 | Japan | 180/164 |
| 3104785 | 5/1991 | Japan | 180/901 |
| 4166481 | 6/1992 | Japan | 180/164 |
| 5-50955 | 3/1993 | Japan | 180/901 |
| 5-77772 | 3/1993 | Japan | 180/901 |
| 2153312 | 8/1985 | United Kingdom . | |

*Primary Examiner*—Douglas C. Butler
*Attorney, Agent, or Firm*—Merchant, Gould, Smith, Edell, Welter & Schmidt, P.A.

[57]           ABSTRACT

A vacuum wall walking apparatus includes an annular body frame, a plurality of leg mechanisms extending downward from the body frame, and a plurality of suction cups attached to fore ends of the respective legs. The body frame is composed of a flexible member. The body frame thus constructed is bendable to conform to the profile of a curved surface when the vacuum wall walking apparatus is used with a wall having such curved surface. With this bending or deformation of the body frame, the suction cups are always able to retain an optimum posture to insure that the vacuum wall walking apparatus is stably held on the curved surface of the wall by a vacuum formed in the suction cups. The vacuum wall walking apparatus may include a surface treatment mechanism, in which instance a winch is provided to minimize or substantially eliminate the load exerted from the surface treatment mechanism to the vacuum wall walking apparatus. The surface treatment mechanism further includes a dust exhausting arrangement to secure a surface treatment operation without contamination of the surrounding environment.

22 Claims, 14 Drawing Sheets

VACUUM WALL WALKING APPARATUS

BACKGROUND OF THE INVENTION

1. Field of the Invention

The present invention relates generally to improvements in a vacuum wall walking apparatus, and more particularly to such a vacuum wall walking apparatus of the type having a surface treatment mechanism.

2. Description of the Related Art

Conventionally, cleaning of external walls and windows of multistoried buildings and the maintenance of wall surfaces of such multistoried buildings are achieved manually by workers with the help of a scaffolding, a high lift working vehicle or a gondola.

To meet the demand for mechanization and automation of high place works, vacuum wall walking apparatus equipped with a surface treatment mechanism have been studied and partially put into practical use. The vacuum wall walking apparatus includes a plurality of leg mechanisms each having a suction cup at a distal end thereof. The suction cups alternate sucking (holding) and non-sucking (releasing) operations in timed relation to the movement of the leg mechanisms so that the vacuum wall walking apparatus moves or crawls on the surface of a wall just like a "spider".

The prior vacuum wall walking apparatus encounters a problem, however, that when it is used with a multistoried building having various curved walls, such as a large ship, only an insufficient degree of vacuum is formed in the suction cups due to inappropriate orientation or posturing of the individual suction cups relative to corresponding portions of the curved surface.

To deal with this problem, the leg mechanisms have an articulated construction to secure a two-dimensional or a three-dimensional operation. To this end, each leg mechanism is provided with a number of actuators. The leg mechanisms are, therefore, rendered large in size and complicated in construction with the result that the overall size and weight of the vacuum wall walking apparatus is greatly increased.

In the case where the surface treatment mechanism mounted on the vacuum wall walking apparatus is composed of a blasting mechanism, a stream of abrasive powder is blown at a high speed against the wall surface. Accordingly, during the blasting operation, the vacuum wall walking apparatus is subjected to a large reaction force. The same is true of the surface treatment mechanism composed of a rotary steel brush. The reaction force increases with the capacity of the surface treatment mechanism. Furthermore, since the conventional surface treatment mechanism is directly mounted on the vacuum wall walking apparatus, the vacuum wall walking apparatus should support its own weight as well as the weight of the surface treatment mechanism. This means that the vacuum wall walking apparatus requires a rigid construction which is strong enough to withstand such a heavy load or weight and which is capable of forming a large suction force corresponding to the heavy load. The conventional vacuum wall walking apparatus equipped with the surface treatment mechanism is, therefore, rendered large in size, complicated in construction and expensive to manufacture. For this reason, the widespread use of the vacuum wall walking apparatus has not been realized.

Another problem associated with the conventional vacuum wall walking apparatus is that the surface treatment mechanism should be fully covered with a tent-like fabric to prevent dusts (dirt, rust and scale) from scattering or flying out to the environment. In general, the cover fabric is displaced pitch by pitch by the worker's hands in synchronism with the movement of the vacuum wall walking apparatus. Accordingly, an unmanned operation of the vacuum wall walking apparatus is difficult to achieve. The same may be said of the surface treatment mechanism composed of a rotary steel brush.

SUMMARY OF THE INVENTION

With the foregoing drawbacks of the prior art in view, it is an object of the present invention to provide a vacuum wall walking apparatus which is light in weight and adaptable to various curved surfaces of the wall.

Another object of the present invention is to provide an inexpensive light-weight vacuum wall walking apparatus equipped with a surface treatment mechanism.

A further object of the present invention is to provide a vacuum wall walking apparatus having a suitable countermeasure against a problem caused due to dusts and dirt produced during operation of a surface treatment mechanism mounted on the vacuum wall walking apparatus.

In one aspect the present invention provides a vacuum wall walking apparatus including an annular body frame, a plurality of leg mechanisms extending downward from the body frame, and a plurality of suction cups attached to fore ends of the respective legs. The body frame is composed of a flexible member.

When the vacuum wall walking apparatus of the foregoing construction is used with a wall having a curved surface, the flexible body frame is deformable to follow the profile of the curved surface. With this deformation of the body frame, the suction cups are able to take an optimum posture directly confronting corresponding portions of the curved surface.

The flexible member preferably has a hollow float-like structure. The annular base frame composed of a hollow float-like flexible member is light in weight and simple in construction.

According to a preferred embodiment, the flexible member is composed of a plurality of hollow elements connected together at opposite ends by a plurality of connecting fittings so as to jointly form an annular shape. The hollow elements are simple in construction and light in weight, and so the base frame can be manufactured less costly.

In another preferred embodiment, the flexible member is composed of a plurality of hollow flexible tubes bundled together. This arrangement provides a further reduction in manufacturing cost.

The flexible member is preferably made from a flexible material such as rubber or flexible resin. The flexible member also has a function to absorb an impact force or shock which may be exerted thereon during operation of the vacuum wall walking apparatus.

It is preferable that the annular body frame is bendable at least about its central portion.

In another aspect, the present invention provides a vacuum wall walking apparatus of the type having a plurality of leg mechanisms each provided at its fore end with a suction cup and operable to move the vacuum wall walking apparatus on and along a surface of a wall, and a surface treatment mechanism mounted on the vacuum walking apparatus for achieving a surface treatment of the surface of the wall. The vacuum wall walking apparatus further includes means for supporting the surface treatment mechanism on the vacuum wall walking apparatus such that the surface treatment mechanism is movable in a first direction substantially parallel to the surface of the wall, and that the surface treatment and the vacuum wall walking apparatus are relatively displaceable within a limited range of distance at least in a second direction substantially perpendicular to the surface of the wall. A winding means is adapted to be installed on the wall side for moving the surface treatment mechanism in the second direction independently of the movement of the vacuum wall walking apparatus while controlling the position of the surface treatment mechanism relative to the vacuum wall walking apparatus.

Since the surface treatment mechanism is lifted up and down by the winding means, the weight of the surface treatment mechanism is not exerted on the vacuum wall walking apparatus. In other words, no load should be borne by the vacuum wall walking apparatus except the weight of the vacuum wall walking apparatus itself. It is therefore possible to simplify the construction of the vacuum wall walking apparatus and reduce the weight of the same.

In a preferred embodiment, the vacuum wall walking apparatus further includes position detecting means disposed on at least one of the vacuum wall walking apparatus and the surface treatment mechanism for detecting the surface treatment mechanism when the position of the surface treatment mechanism deviates from a reference position on the vacuum wall walking apparatus. When the position detecting means detects the surface treatment mechanism, the speed of movement of the vacuum wall walking apparatus is shifted up or down, or alternatively, the speed of movement of the surface treatment mechanism is shifted down or up. Thus, synchronism can readily be established between the movement of the vacuum wall walking apparatus and the movement of the surface treatment mechanism.

The support means preferably includes a guide means for guiding the surface treatment mechanism while it is moving in the first direction, and a joint means interconnecting the guide means and the vacuum wall walking apparatus while allowing them to move relatively to one another in the second direction within the limited range of distance. In one preferred form, the vacuum wall walking apparatus further includes an annular body frame from which the leg mechanisms extend. The guide means comprises at least one guide rail extending in the second direction and disposed within a space defined in the annular body frame, the guide rail slidably supporting thereon the surface treatment mechanism. The joint means preferably comprises a parallel link or an elastic joint.

In still another aspect, the present invention provides a vacuum wall walking apparatus of the type including a surface treatment mechanism mounted on a body of the vacuum wall walking apparatus for achieving a surface treatment of a surface of a wall while the vacuum wall walking apparatus is moving on and along the surface of the wall. The surface treatment mechanism includes a box having one side open to cover a portion of the surface of the wall to be treated by the surface treatment mechanism, the box having a dust exhaust port. A vacuum exhaust hose is connected at one end to the dust exhaust port for exhausting dust from an internal space of the box under suction. The surface treatment mechanism does not contaminate the surrounding environment.

The box preferably has a pad attached to the open side to provide a certain degree of airtightness to the box. At least one of the box and the pad has a vacuum break opening for allowing the outside air to be introduced into the box while a vacuum is formed in the box. With the vacuum break opening thus provided, the box is protected from becoming caught by suction on the surface of the wall. The pad is preferably formed from an elastic material to protect the wall surface against damage.

In one preferred form, the box is an elongate box and contains a plurality of tools arranged in series along a longitudinal axis of the elongate box for the surface treatment of the surface of the wall. The surface treatment mechanism is preferably movable in a direction relative to the vacuum wall walking apparatus in which instance the tools are aligned in a direction transverse to the direction of movement of the surface treatment mechanism. The tools thus arranged are able to increase the area of surface to be treated by a single cycle of operation of the surface treatment mechanism.

The above and other objects, features and advantages of the present invention will become manifest to those versed in the art upon making reference to the detailed description and accompanying sheets of drawings, in which preferred structural embodiments incorporating the principles of the present invention are shown by way of illustrative examples.

DETAILED DESCRIPTION OF THE PREFERRED EMBODIMENTS

Figure 1:
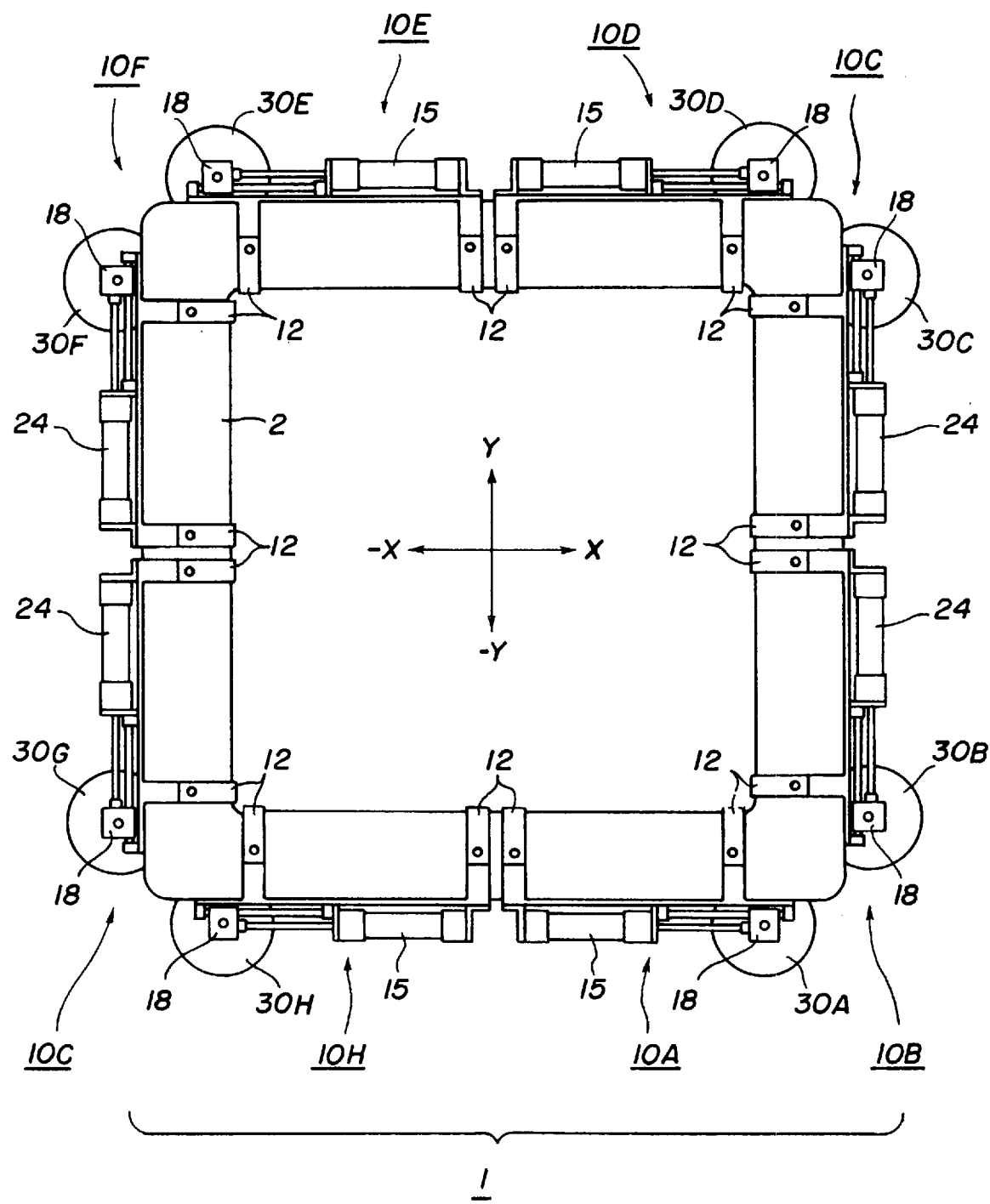
FIG. 1 is a plan view of a vacuum wall walking apparatus according to a first embodiment of the present invention.

Certain preferred embodiments of the present invention will be described in greater detail with reference to the accompanying sheets of drawings. For purposes of illustration, description will be given first of a vacuum wall walking apparatus per se shown in FIGS. 1 through 6, and next of a vacuum wall walking apparatus equipped with a surface treatment mechanism. In the drawings, reference character X denotes a horizontal axis parallel to the surface of a wall, Y a vertical axis parallel to the wall surface, and Z a vertical axis perpendicular to the wall surface.

Referring now to FIG. 1, there is shown a vacuum wall walking apparatus 1 according to a first embodiment of the present invention. As better shown in FIG. 2, the vacuum wall walking apparatus 1 includes an annular body frame 2 in the form of a substantially square ring, a plurality of leg mechanisms 10A, 10B, 10C, 10D, 10E, 10F, 10G and 10H extending downward from the body frame, and a corresponding number of suction cups 30 attached to fore or lower ends of the respective leg mechanisms 10A - 10H.

The body frame 2 has a hollow structure like a float, and is formed from a flexible material such as rubber or flexible resin. The body frame 2 made of a flexible material also has a function to cushion or absorb an impact force or shock exerted on the body frame 2.

The leg mechanism 10A and the leg mechanism 10B are mirror-image parts so that all the components of these mechanisms 10A, 10B are the same in construction but different in orientation. Accordingly, description given below will be directed only to structural details of the leg mechanism 10A.

Figure 3:
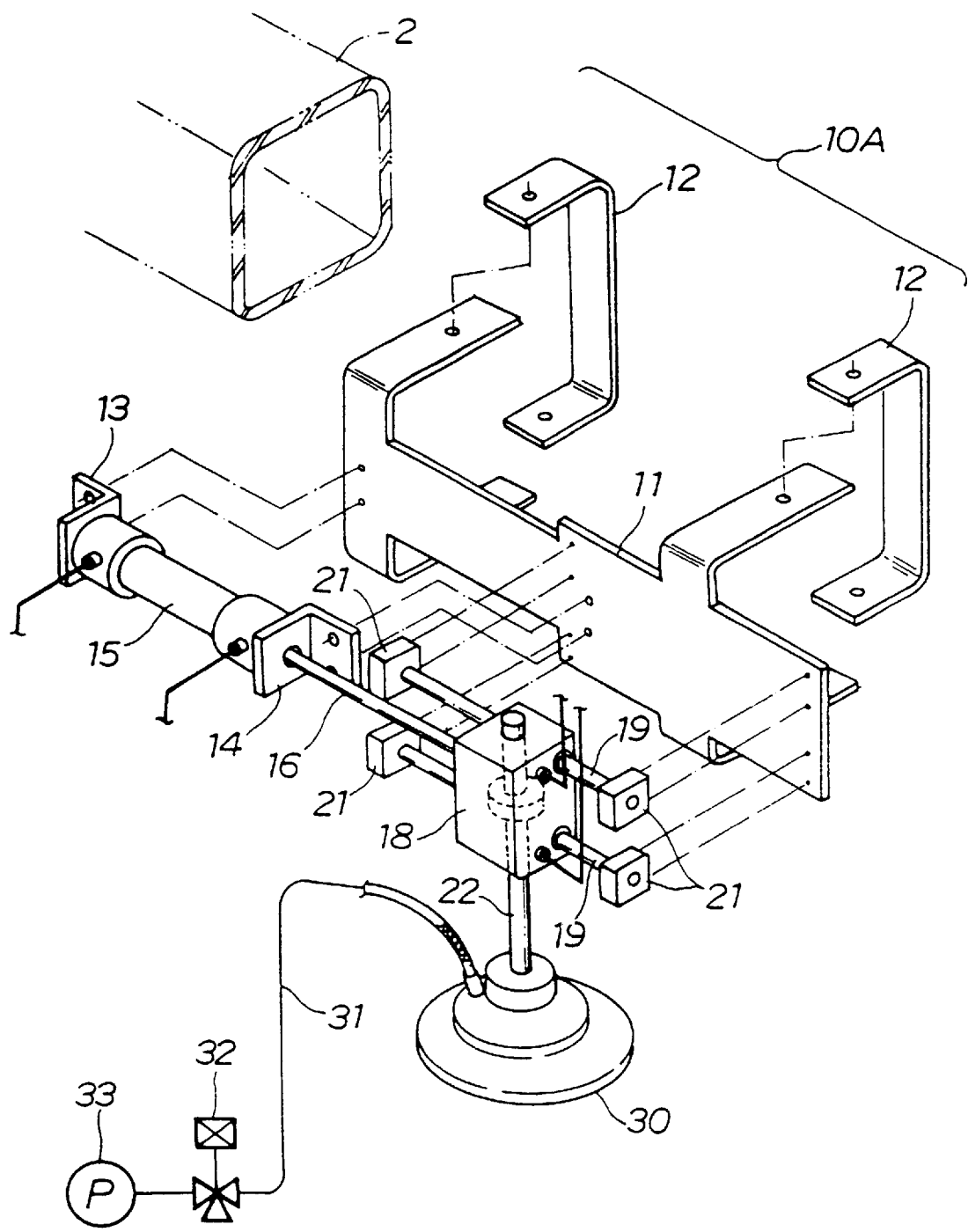
FIG. 3 is an exploded perspective view of an essential part of the vacuum wall walking apparatus.

As shown on enlarged scale in FIG. 3, the leg mechanism 10A generally comprises a mounting bracket 11, a pair of metal strips or bands 12 and 12, an X direction cylinder 15 (hereinafter referred to as "X cylinder") attached to the mounting bracket 11 via a pair of attachments 13 and 14, and a Z direction cylinder 18 (hereinafter referred to as "Z cylinder") movable to and fro in response to the reciprocating movement of a piston rod 16 of the X cylinder 15. Designated by 19, 19 are a pair of parallel spaced guide rods provided to maintain a vertical posture of the Z cylinder 18 while in reciprocating motion. The guide rods 19 are secured at opposite ends to the mounting bracket 11 by two pairs of fixed blocks 21, respectively.

The Z cylinder 18 has a piston rod 22, and one of the suction cups 30 is attached to an outer end of the piston rod 22. The suction cup 30 is molded of rubber or flexible resin and has an inverted cup shape. The suction cup 30 is connected by a flexible hose 31 to a three port connection solenoid valve 32 and to a vacuum source 33 such as a vacuum compressor or pump. In operation, the vacuum source 33 forms an increased degree of vacuum in an internal space of the suction cup 30 to thereby hold the suction cup 30 by suction on the wall surface. The three port connection solenoid valve 32 is operative to isolate the hose 31 from the vacuum source 33 and bring the hose 31 into fluid communication with the atmospheric air whereupon the internal pressure of the hose 31 and the suction cup 30 immediately return to the atmospheric pressure and, hence, a suction force acting on the suction cup 30 is vanished or disappears. This condition is hereinafter referred to as "non-sucking" condition or state.

Returning to FIG. 2, the leg mechanism 10B is the same as the leg mechanism 10A just described above with the exception that the X cylinder 15 is replaced by a Y direction cylinder 24 (hereinafter referred to as "Y cylinder"). With the similarity in view, further description of the leg mechanism 10B can be omitted. Each of the leg mechanisms 10A, 10E and 10H has an X cylinder 15, and each of the leg mechanisms 10B, 10F and 10G has a Y cylinder 24.

Figure 2:
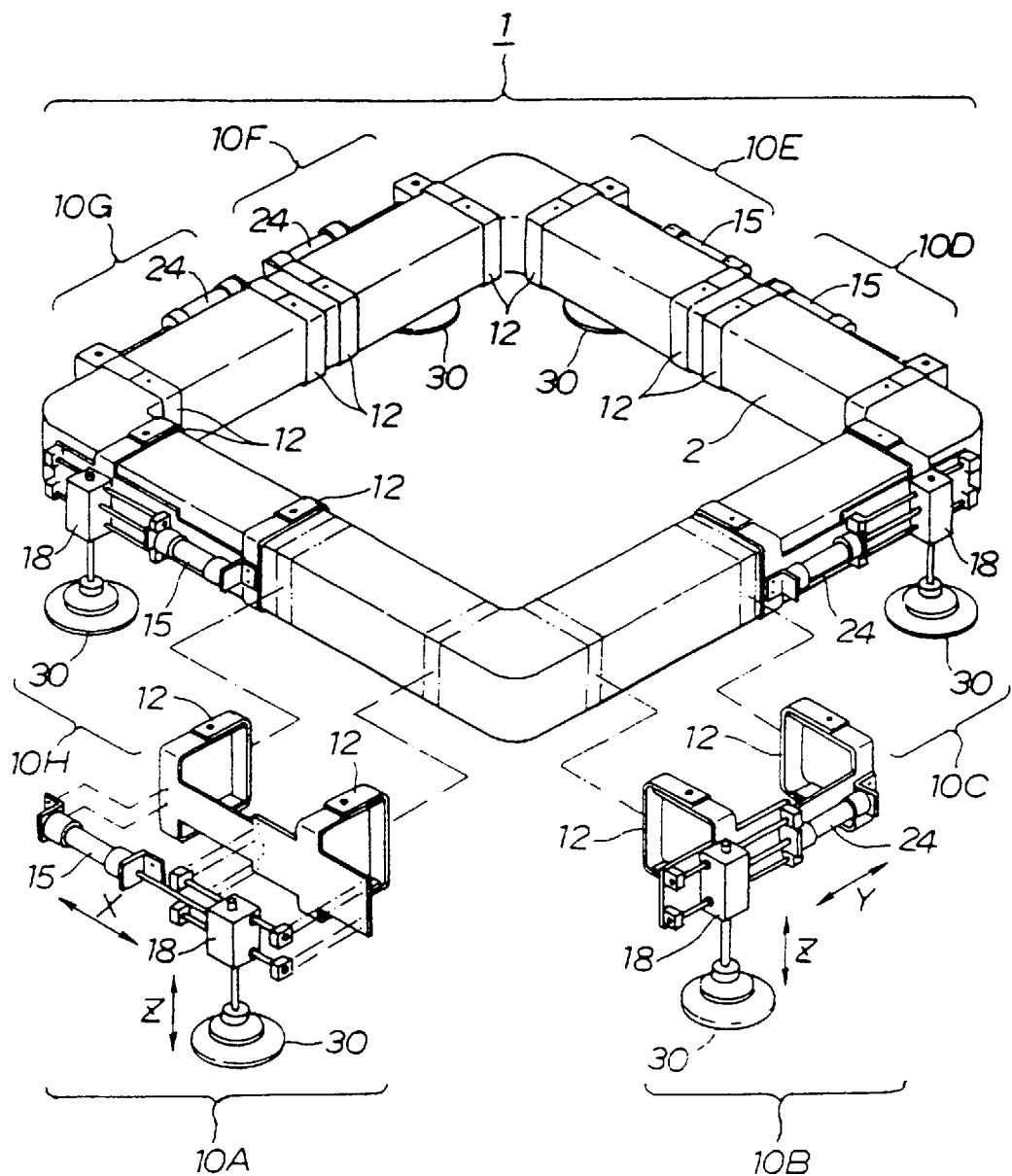
FIG. 2 is an exploded perspective view of the vacuum wall walking apparatus.

The leg mechanisms 10A, 10D, 10E and 10H move the respective suction cups 30 in the X direction in FIGS. 1 and 2 by the action of the associated X cylinders 15, while the leg mechanisms 10B, 10C, 10F and 10G move the respective suction cups 30 by the action of the associated Y cylinders 24. Accordingly, by using either leg mechanism set or group, the vacuum wall walking apparatus 1 is able to walk or crawl by its own power.

In FIG. 1 the total of eight suction cups are designated, for convenience, by 30A, 30B, 30C, 30D, 30E, 30F, 30G and 30H. The vacuum wall walking apparatus 1 can be moved in any of the directions of the characters X, -X, Y and -Y in a manner described below, however, description given below will be limited to the movement in the Y direction. In the following description, the term "cylinder advancing movement" is used to refer to the condition in which the piston rod of the cylinder is extended, while the term "cylinder retracting movement" is used to refer to the condition in which the piston rod of the cylinder is contracted.

At first, the suction cups 30C and 30F are placed in the non-sucking condition or state. Then, the associated Z cylinders (reference characters will be omitted) undertake the cylinder retracting movement, followed by the cylinder advancing movement of the corresponding Y cylinders. Subsequently, the Z cylinders undertake the cylinder advancing movement. The suction cups 30C and 30F are thus advanced in the Y direction by one pitch. At this position, the suction cups 30C and 3OF are placed in the sucking condition.

Then, the suction cups 30A, 30D, 30E and 30H are placed in the non-sucking condition, and preferably they are further moved to the standby position by the cylinder retracting movement of the associated Z cylinders.

At the same time or immediately thereafter, the Y cylinders associated with the suction cups 30B and 30G undertake the cylinder advancing movement and the Y cylinders associated with the suction cups 30C and 30F undertake the cylinder retracting movement. Thus, the body frame 2 is advanced in the Y direction by one pitch.

Thereafter, the suction cups 30A, 30D, 30E and 30H are placed in the sucking condition.

Subsequently, the suction cups 30B and 30G are placed in the non-sucking condition and after that the associated Z cylinders undertake the cylinder retracting movement. Then, the corresponding Y cylinders undertake the cylinder retracting movement, followed by the cylinder advancing movement of the Z cylinders. The suction cups 30B and 30C are thus advanced in the Y direction by one pitch. Now, the condition shown in FIG. 1 is restored.

One example of operation of the vacuum wall walking apparatus 1 has been disclosed and described. The operation of the vacuum wall walking apparatus should by no means be limited to the disclosed example.

The operation required to move the vacuum wall walking apparatus 1 in any of the -Y, X and -X directions is the same as the above-described operation, and so further description of the operation can be omitted.

Figure 4:
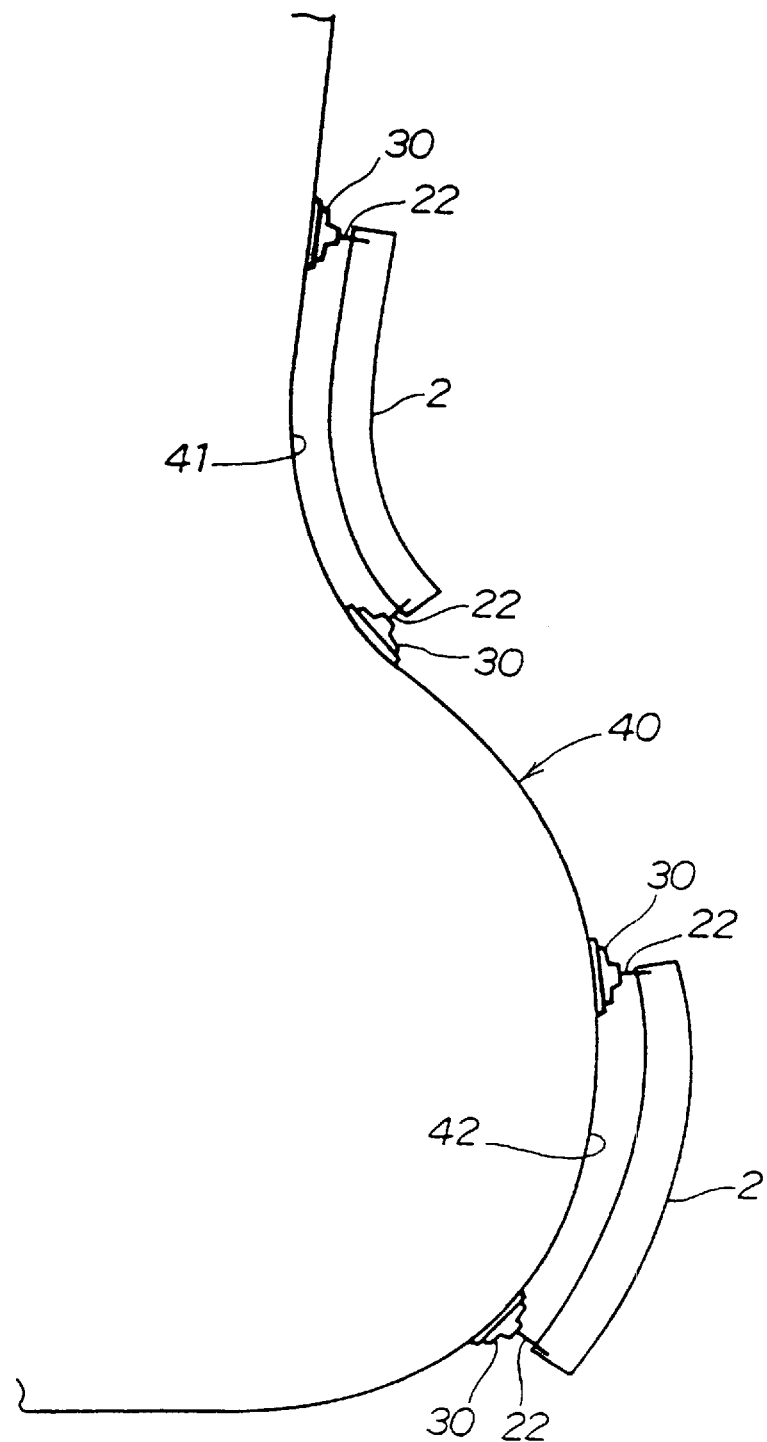
FIG. 4 is a diagrammatical view showing the vacuum wall walking apparatus while in operation.

Operation of the vacuum wall walking apparatus will be supplemented in conjunction with an example of application shown in FIG. 4. As shown in FIG. 4, the shell plate 40 of a large ship has a variety of curved surfaces, such as a concaved surface 41 and a convex surface 42. In the vacuum wall walking apparatus of this invention, the body frame 2 is deformable to follow the profile of the concaved surface 41 and the convex surfaces. To be exact, the body frame 2 is bendable about a central portion thereof because other portions of the body frame 2 are confined or otherwise clamped by the mounting brackets 11 and the bands 12, 12. With this deformation of the body frame 2, the suction cups 30 always come into intimate contact with the shell plate 40, so that they are able to form a sufficient suction force large enough to hold the suction cups 30 stably in position against displacement. The vacuum wall walking apparatus 1 having such a bendable body frame 2 is freely movable by its own power on and along the curved surfaces of the shell plate.

Figure 5:
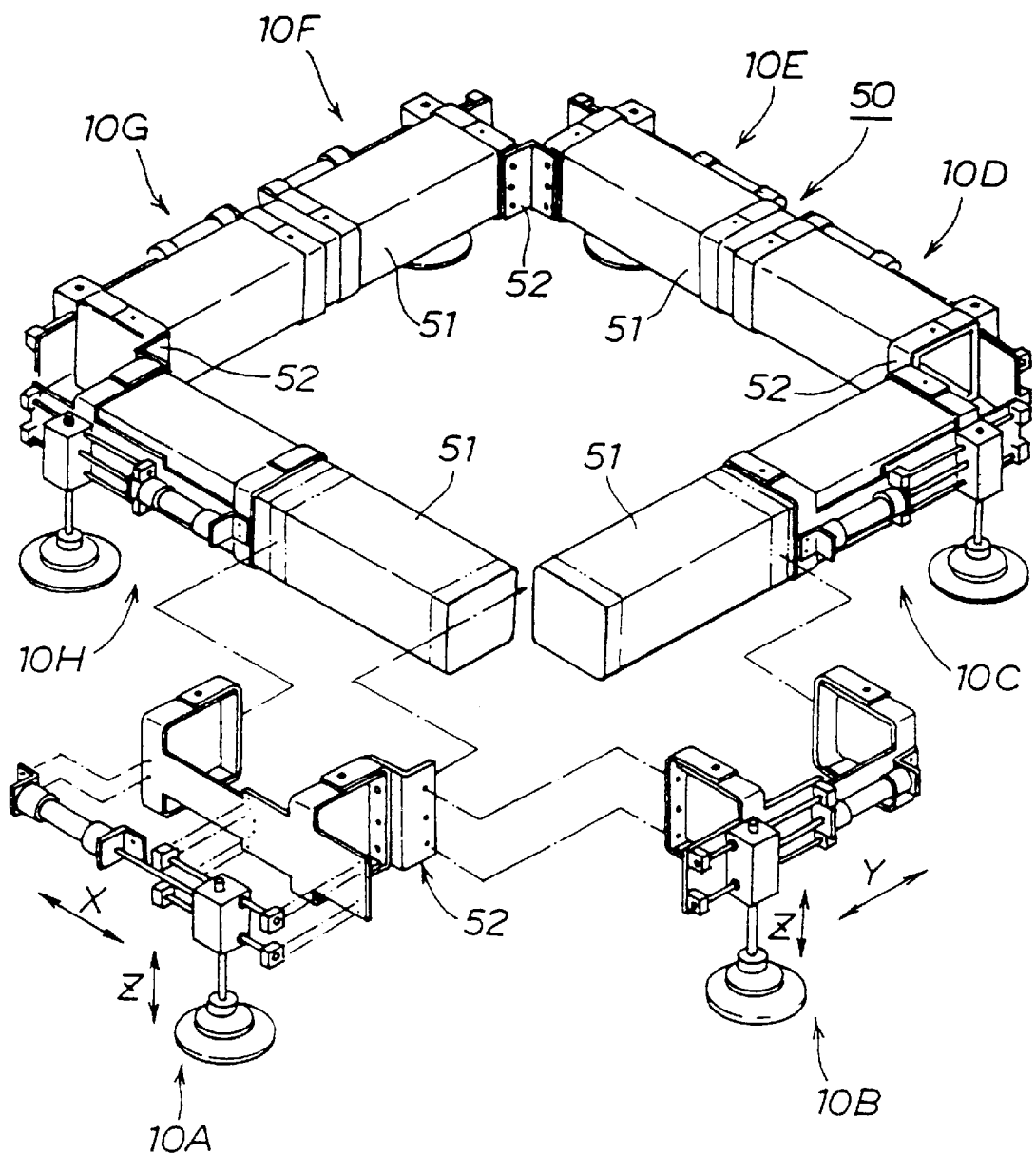
FIG. 5 is an exploded perspective view of a vacuum wall walking apparatus according to a second embodiment of the present invention.

FIG. 5 illustrates, in exploded perspective view, a vacuum wall walking apparatus according to a second embodiment of the present invention. The vacuum wall walking apparatus includes a body frame 50 composed of a plurality (four in the illustrated embodiment) of hollow frame members or elements 51 molded of rubber or flexible resin and each having two connecting fittings 52 located at opposite ends of the frame element 51. By interconnecting or joining the adjacent connecting fittings 52, the frame elements 51 are connected together at opposite ends so as to form a square ring-like shape. The hollow frame elements 51 have a rectangular cross section and are closed at opposite ends. Leg mechanisms 10A–10H are identical to those of the first embodiment shown in FIGS. 1–3, and so the same reference characters as the first embodiment are also used to designate the identical parts. No further description of the leg mechanisms will be necessary.

According to the second embodiment, the generally square ring-like body frame 50 are devoid of corner portions. Another feature is that the discrete hollow frame elements 51 are simple in shape and construction and makes it possible to manufacture the body frame 50 at a low cost.

Though not shown, each of the hollow frame elements 51 may be replaced with a frame element assembly composed of a pair of identical tubes of light metal alloy connected end to end with a short rubber flexible tube dispose therebetween, the light metal alloy tubes being half in length of the hollow frame element 51. The light metal alloy is preferably composed of an aluminum alloy or an aluminum-magnesium alloy. The use of the frame element assembly facilitates direct attachment of the X cylinders 15, for example, and the fixed blocks 21 (see FIG. 3) to the light metal alloy tubes without the reliance on the use of the mounting brackets 11.

Figure 6:
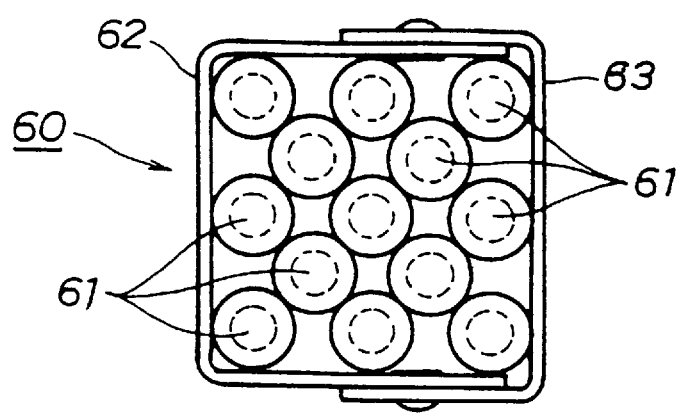
FIG. 6 is an end view showing a body frame according to a modification of the present invention.

FIG. 6 diagrammatically shows a modified form of the body frame of this invention. The modified body frame 60 is composed of a plurality of small-diameter hollow tubes 61, such as rubber tubes, bundled together by a plurality of pairs of bands 62 and 63 (only one band pair being shown). The body frame 60 can be manufactured less costly than the body frame 50 of the second embodiment shown in FIG. 5.

Figure 7:
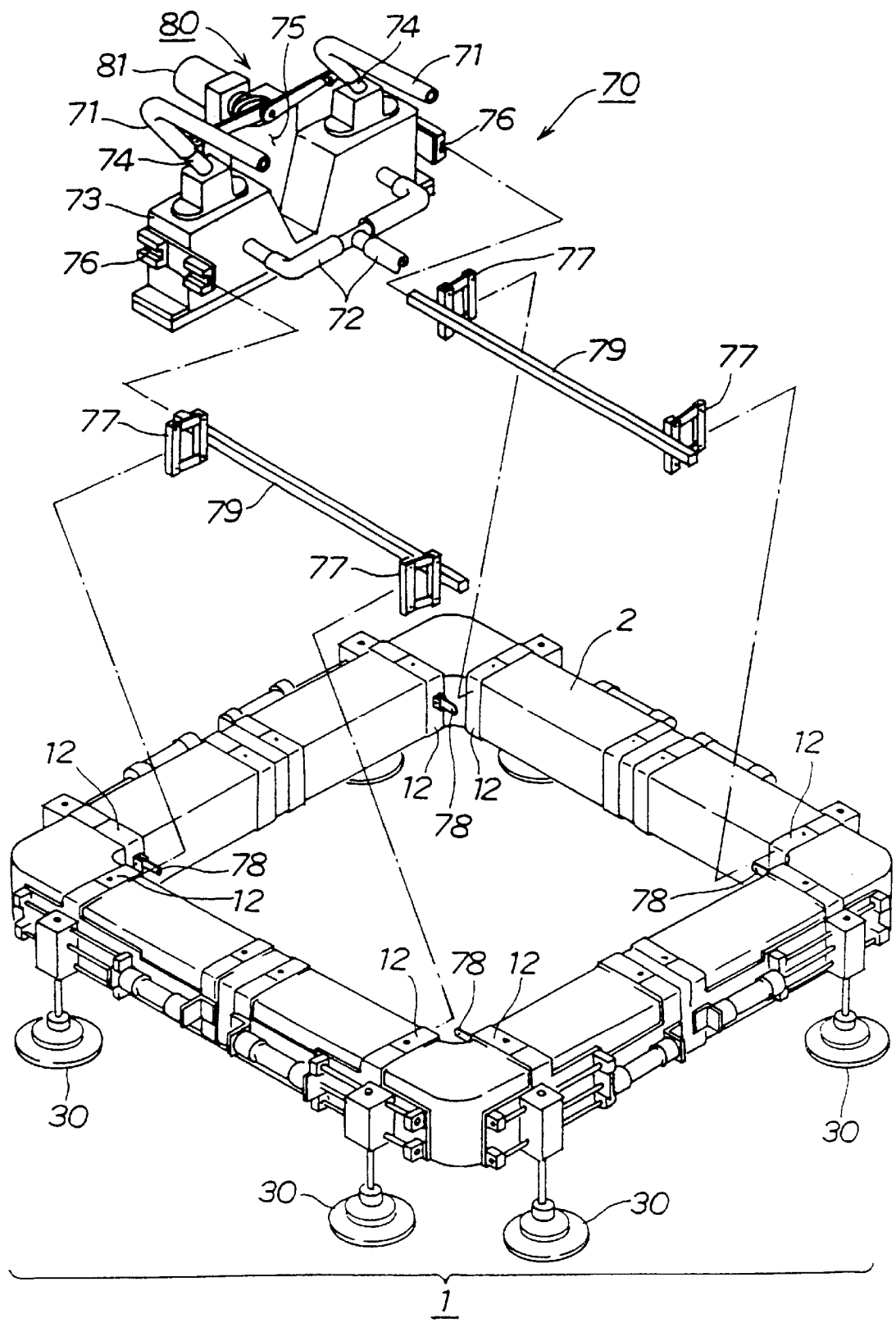
FIG. 7 is an exploded perspective view of a vacuum wall walking apparatus provided with a blasting mechanism according to the present invention.

FIG. 7 is an exploded perspective view of a vacuum wall walking apparatus 1 equipped with a blasting mechanism 70 according to the present invention. The blasting mechanism 70 constitutes a typical surface treatment mechanism mountable on the vacuum wall walking apparatus 1 of the present invention. The blasting mechanism 70 includes a blast box 73, a pair of blast hoses 71 and 71 having at their one end a pair blast nozzles 74, 74, respectively, connecting the hoses 71 to the blast box 73, a nozzle oscillating mechanism 80 for oscillating or swinging the blast nozzles 74, 74 within a predetermined angular range, a wire anchor plate 75 for being connected to one end of a wire (the plate 75 serving also as a support plate for a motor 81), and a pair of guide grooves 76, 76.

A pair of parallel spaced guide rails 79, 79 is articulated at opposite ends to two sets of bands 12, 12 of the vacuum wall walking apparatus 1 via two pairs of parallel links 77, 77 and two pairs of single links 78, 78. Each of the band sets 12 is composed of two adjacent ones of the bands 12 located near a corner of the body frame 2. The blasting mechanism 70 is slidably mounted on the guide rails 79, 79 via a slide fit between the guide rails 79, 79 and the guide grooves 76, 76 in the blasting mechanism 70.

Figure 8:
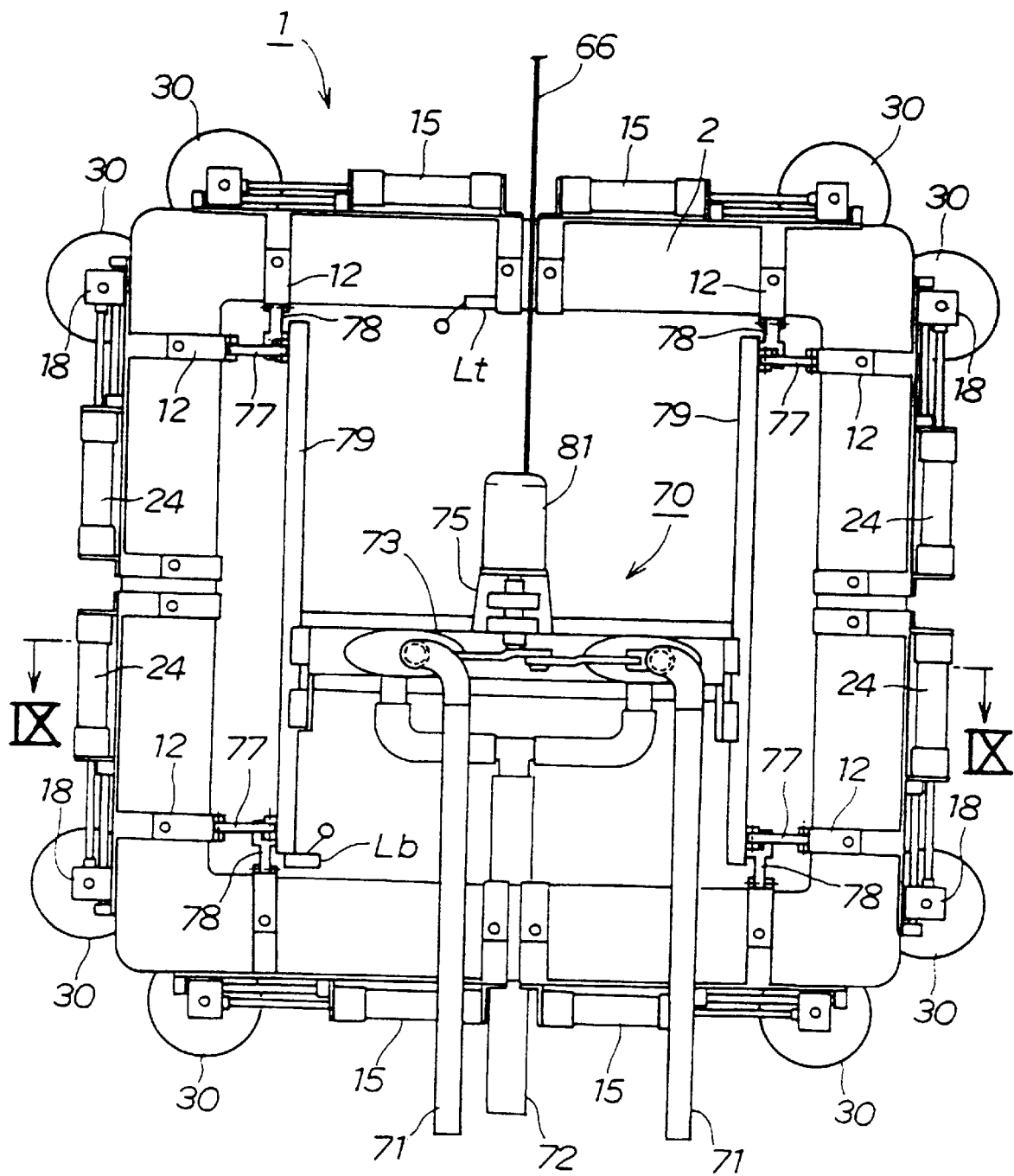
FIG. 8 is a plan view of the vacuum wall walking apparatus equipped with the blasting mechanism.

As best shown in FIG. 8, each of the parallel links 77 is connected to the body frame 2 via one of the two adjacent bands 12, and a corresponding one of the single links 78 is connected to the body frame 2 via the other of the two adjacent bands 12. Each end of the guide rails 79, 79 is attached to the parallel link 77 and the single link 78. The blasting mechanism 70 is slidably mounted on the guide rails 79, 79 transversely across a space defined between the guide rails 79, 79.

In FIG. 8, the blasting mechanism 70 is movable in the vertical direction relative to the body frame 2 of the vacuum wall walking apparatus 1, however, movement in a direction perpendicular to the plane of the drawing sheet is limited. Reference characters Lt and Lb denote a top position detecting means and a bottom position detecting means, respectively. The position detecting means Lt, Lb detect the arrival of the blasting mechanism 70 at the position of the position detecting means Lt, Lb.

The position detecting means Lt, Lb may include a variety of relative position detecting means without distinction of the type, such as a limit switch having a lever actuator, a limit switch having an actuator pin or plunger, a magnetic proximity switch, and an optical proximity switch.

Figure 9:
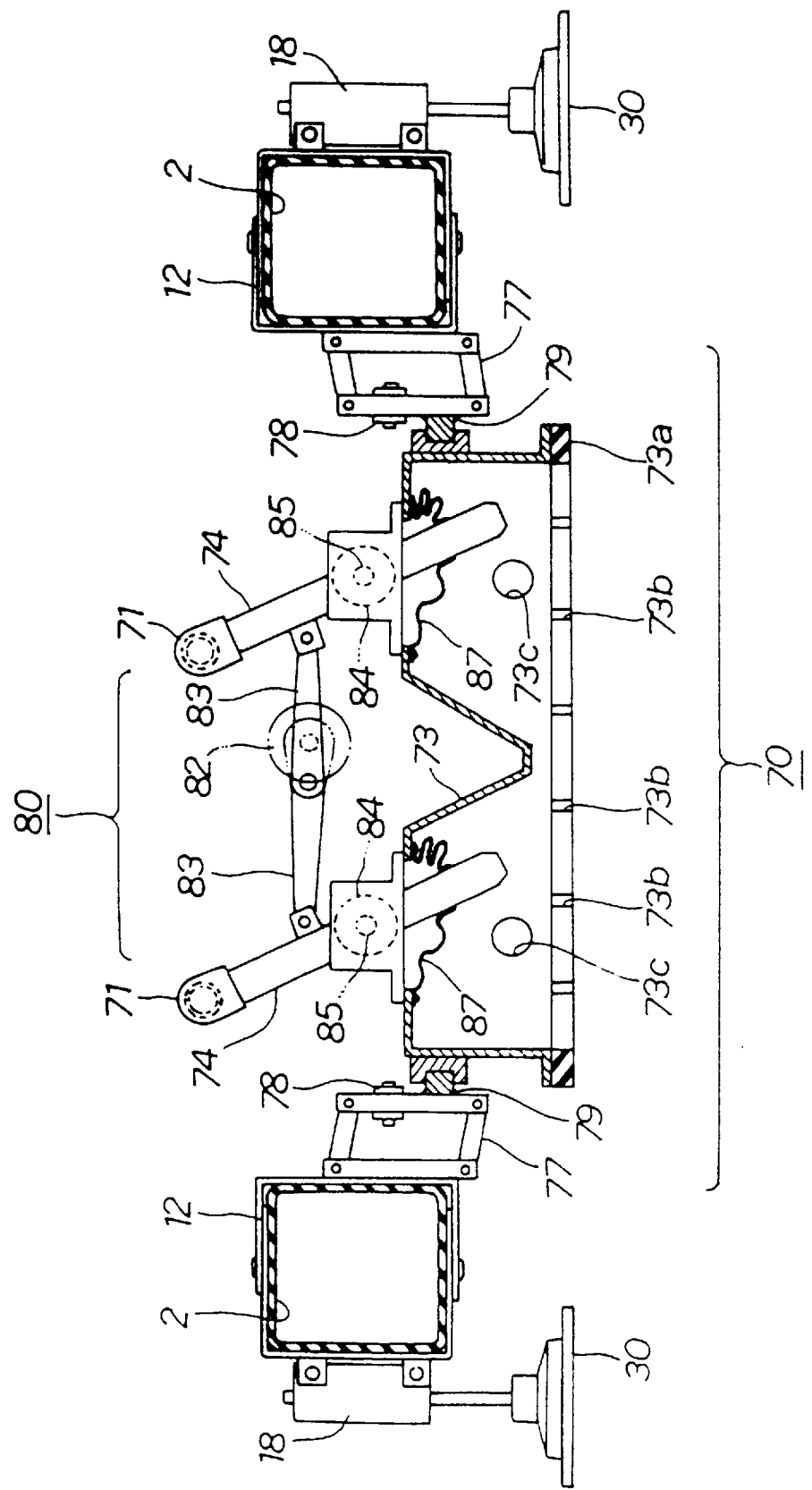
FIG. 9 is a cross-sectional view taken along line IX—IX of FIG. 8.

FIG. 9, a cross sectional view taken along the line IX—IX of FIG. 8, shows in greater detail the cross section of the blasting mechanism 70. The blasting mechanism 70 includes a pad 73a of rubber or flexible resin attached to a bottom edge of the blast box 73 to preclude direct engagement between the blast box 73 and the wall surface, thereby protecting the wall surface against damage. The pad 73a has formed therein an adequate number of vacuum break slits 73b to allow the outside air to be drawn or introduced into the blast box 73 to such an extent that the blast box 73 is smoothly movable along the wall surface without being caught on the wall surface by undue suction or vacuum formed in the box 73. The blast box 73 further has a pair of dust exhaust ports 73c, 73c connected to a bifurcated end of a vacuum exhaust hose 72 (FIGS. 7 and 8).

One feature of the blasting mechanism 70 is that during the operation of the blasting mechanism 70, the internal space of the blast box 73 is kept at a subatmospheric pressure by the vacuum exhaust hose 72. Since dust (shot, rust, scale and dirt) permeating or spreading through the internal space of the blast box 73 is continuously exhausted via the vacuum exhaust hose 72, there is no chance that the dust leaks out from the blast box 73 and contaminates the surrounding environment.

The blast nozzles 74, 74 oscillate or swing about pivot pins 85, 85 by the action of the nozzle oscillating mechanism 80 composed of the motor 81 (FIG. 8), an eccentric cam 82, a pair of levers 83, 83, and a pair of spherical bushings 84, 84, so that abrasive particles generally called "shots" are uniformly blown against a desired area of the wall surface. Designated by 87, 87 are a pair of dust covers associated with the respective nozzles 74, 74 to isolate the spherical bushings 84, 84 from the influence of dust floating within the blast box 73.

One important feature of the present invention is that the body frame 2 and the blast box 73 are connected together by the parallel links 77, 77.

When a vacuum is formed in the internal space of the blast box 73, the pad 73a is brought into contact with the wall surface. In this instance, the body frame 2 may have deformed to conform to the profile of the wall surface. Accordingly, the blast box 73 needs to be displaced in the Z direction relative to the body frame 2. The necessary relative movement in the Z direction is permitted within a predetermined range of distance by means of the parallel links 77, 77 used to connect the blast box 73 and the body frame 2.

Figure 10A:
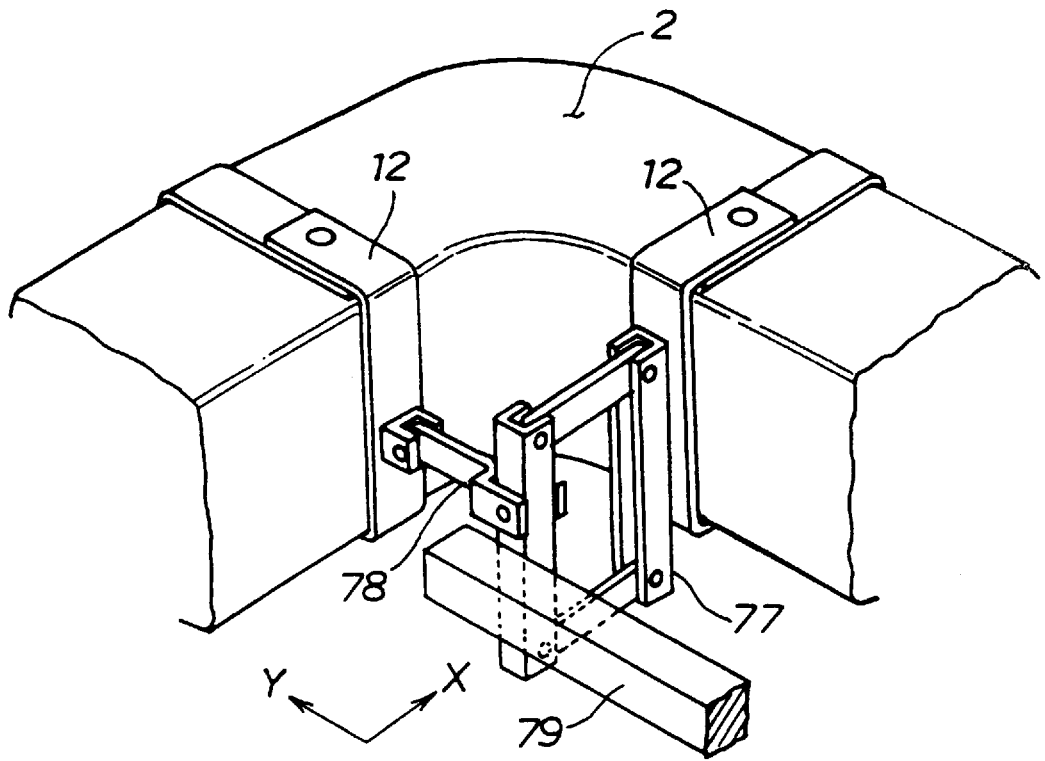
FIG. 10A is a perspective view showing a joint mechanism between the surface treatment mechanism and a frame body of the vacuum wall walking apparatus.

FIG. 10A illustrates on enlarged scale a joint structure between the blasting mechanism 70 (surface treatment mechanism) and the body frame 2 of the vacuum wall walking apparatus of the embodiment shown in FIGS. 8–10. The parallel link 77 is connected at one side to the band 12 of the body frame 2, the opposite side of the parallel link 77 being attached to the guide rail 79. By the use of the parallel link 77, the guide rail 79 is kept free from distortion or twisting as it is located at any position or height in the Z direction. By virtue of its own construction, the parallel link 77 is able to exert a sufficient load-bearing action or effect on the guide rail 79 with respect to the X direction but fails to do so in respect of the Y direction. To deal with this, the single link 78 is used. The single link 78 is attached at one end to an adjacent band 12 and, at the opposite end, to the parallel link 77, thereby preventing displacement of the parallel link 77 in the Y direction.

Figure 10B:
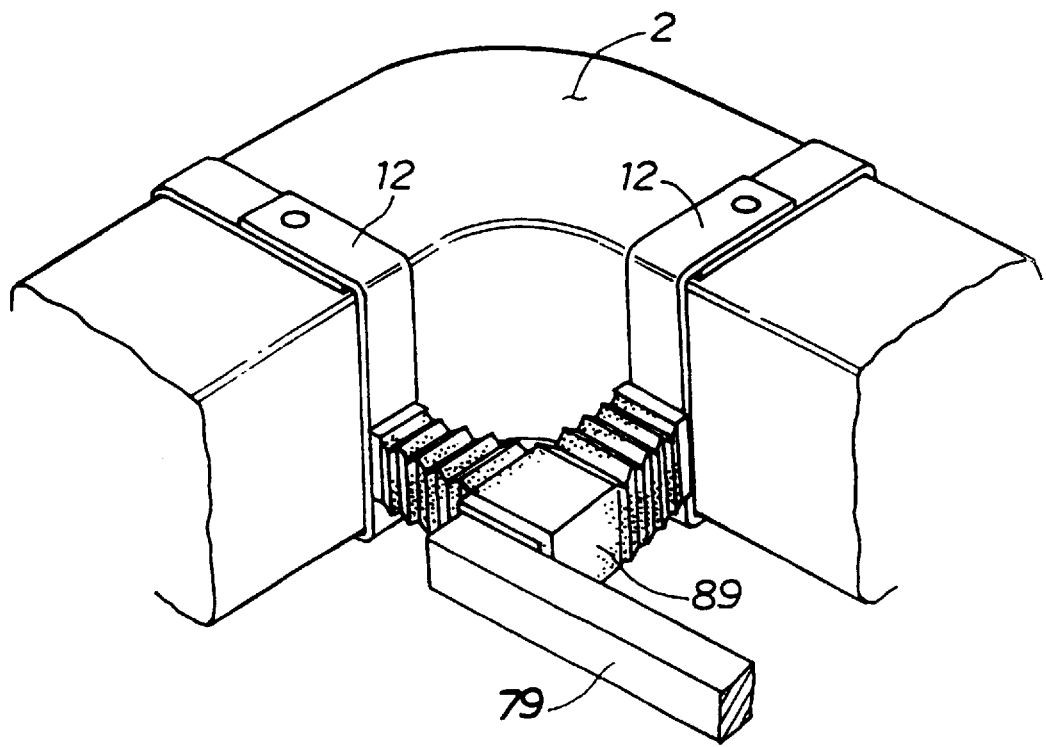
FIG. 10B is a view similar to FIG. 10A, but showing a modified form of the joint mechanism.

A modified joint structure shown in FIG. 10B include a generally L-shaped rubber damper 89 interconnecting one end of a guide rail 79 and two adjacent bands 12, 12 of the body frame 2. The rubber damper 89 has a bellows-like structure having alternating ridges and grooves and is elastically deformable to take up or absorb a desired amount of displacement of the guide rail 79 in the Z direction relative to the body frame 2. The bellows-like rubber damper can also absorb the displacement in the X and Y directions, but an extent of the displacement is much smaller than that in the Z direction.

Figure 11:
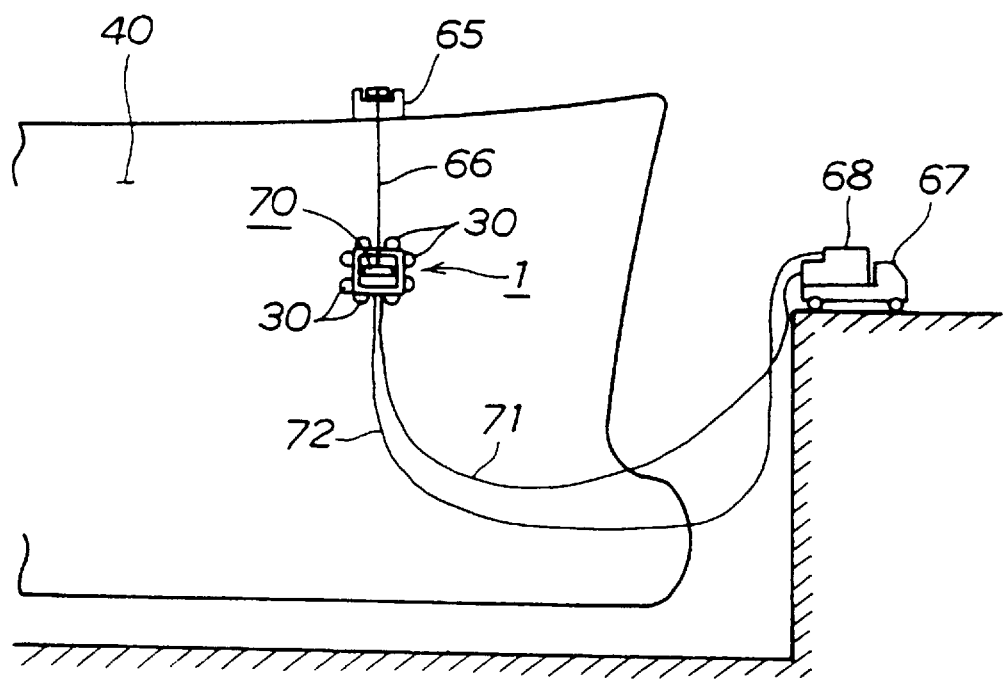
FIG. 11 is a diagrammatical view showing an example of application of the vacuum wall walking apparatus equipped with the surface treatment mechanism according to the present invention.

FIG. 11 illustrates one example of application in which the vacuum wall walking apparatus 1 of this invention which is equipped with the blasting mechanism 70 (surface treatment mechanism) is used for surface treatment of the shell plate 40 of a large ship before the shell plate 40 is painted. In operation, the blasting mechanism 70 is moved in vertical and horizontal directions along the shell plate 40 while performing a sand-blasting or a shot-blasting operation in which streams of abrasive powders, such as sand or shots (small spherical particles of steel or sharp fragments of steel wire) are blown at high speeds against a surface of the shell plate 40 to remove dirt, rust and scale from the plate surface.

The blasting mechanism 70 is a heavy unit and should bear the respective weights of a sagging long blast supply hose 71 and a sagging long vacuum exhaust hose 72. In view of this, a winding means 65, such as a winch, and a wire 66 are provided according to the illustrated embodiment. The winding means 65 is installed on a deck of the large ship for winding up and down the wire 66 to lift up and down the blasting mechanism 70 along the shell plate 40. In this case, the role allotted to the vacuum wall walking apparatus 1 is to hold the blasting mechanism 70 while allowing the same to move or displace relative to the vacuum wall walking apparatus 1 and also to prevent the blasting mechanism 70 from oscillating in the horizontal direction (X direction) but not to support the whole weight of the blasting mechanism 70. Thus, the load exerted on the vacuum wall walking apparatus 1 of the invention is relatively small, and so a considerable reduction in size and weight of the vacuum wall walking apparatus 1 can be attained.

It is possible according to the present invention to install the winding means 65 on a wheeled frame or support (not shown) movable along rails (not shown) layed on the ship deck in the longitudinal direction thereof. With this arrangement, the winding means 65 can be moved in the horizontal direction (X direction) as occasion demands. In FIG. 11, reference numeral 67 denotes a working vehicle parking on a quay. A blasting unit designated by 68 has a function to remove or separate rust, scale and foreign matter from dusts to recover sand or shots, a function to drive or force the recovered sand or shots at a predetermined speed to the blasting mechanism 70 and thence to the surface of the shell wall 40, and any other necessary function.

The vacuum wall walking apparatus 1 shown in FIG. 11 will operate as follows.

At first, the winding means 65 operates to lower the blasting mechanism 70 and the vacuum wall walking apparatus 1 until they arrive at a position of a desired height. Then, the vacuum wall walking apparatus 1 operates to establish the sucking condition in which the apparatus 1 is held by suction on the surface of the shell wall 40, Subsequently, the blasting unit 68 is driven to feed sand or shots to the blasting mechanism 70 in which the sand or shots are blasted or blown against the surface of the shell plate 40. A portion of the surface located below the blast box 73 (see FIGS. 8 and 9) is uniformly peened or blasted with sand or shots with the result that dirt, rust and scale are removed from the blasted surface portion. A mixture of sand or shots and the removed substances (dirt, rust and scale) is immediately recovered through the vacuum exhaust hose 72 (now serving as a blast recovery hose) to the blasting unit 68. Then, the winding means 65 continuously winds up the wire 65 to gradually elevate the blast box 73 with the result that the surface of the shell plate 40 is continuously blasted or treated in a vertical upward direction. During that time, in synchronism with upward movement of the blasting mechanism 70 (winding speed of the wire 66), the vacuum wall walking apparatus 1 is propelled in a vertical upward direction by its own power.

It may occur that the walking speed of the vacuum wall walking apparatus 1 deviates from the winding speed of the blasting mechanism 70, and vice versa. The occurrence of this phenomenon is detected by the top position detecting means Lt or the bottom position detecting means Lb. More specifically, when the top position detecting means Lt detects the arrival of the blast box 73, the winding speed of the wire 66 is slowed down or the wire winding operation is stopped. Alternatively, when the bottom position detecting means Lb detects the arrival of the blast box 73, the wire winding operation is started or the wire winding speed is increased. According to this technique, the vacuum wall walking apparatus 1 is allowed to continue its upward walking or crawling at a constant speed and, accordingly, a controller (not shown) used does not need a complicated arrangement.

Figure 12:
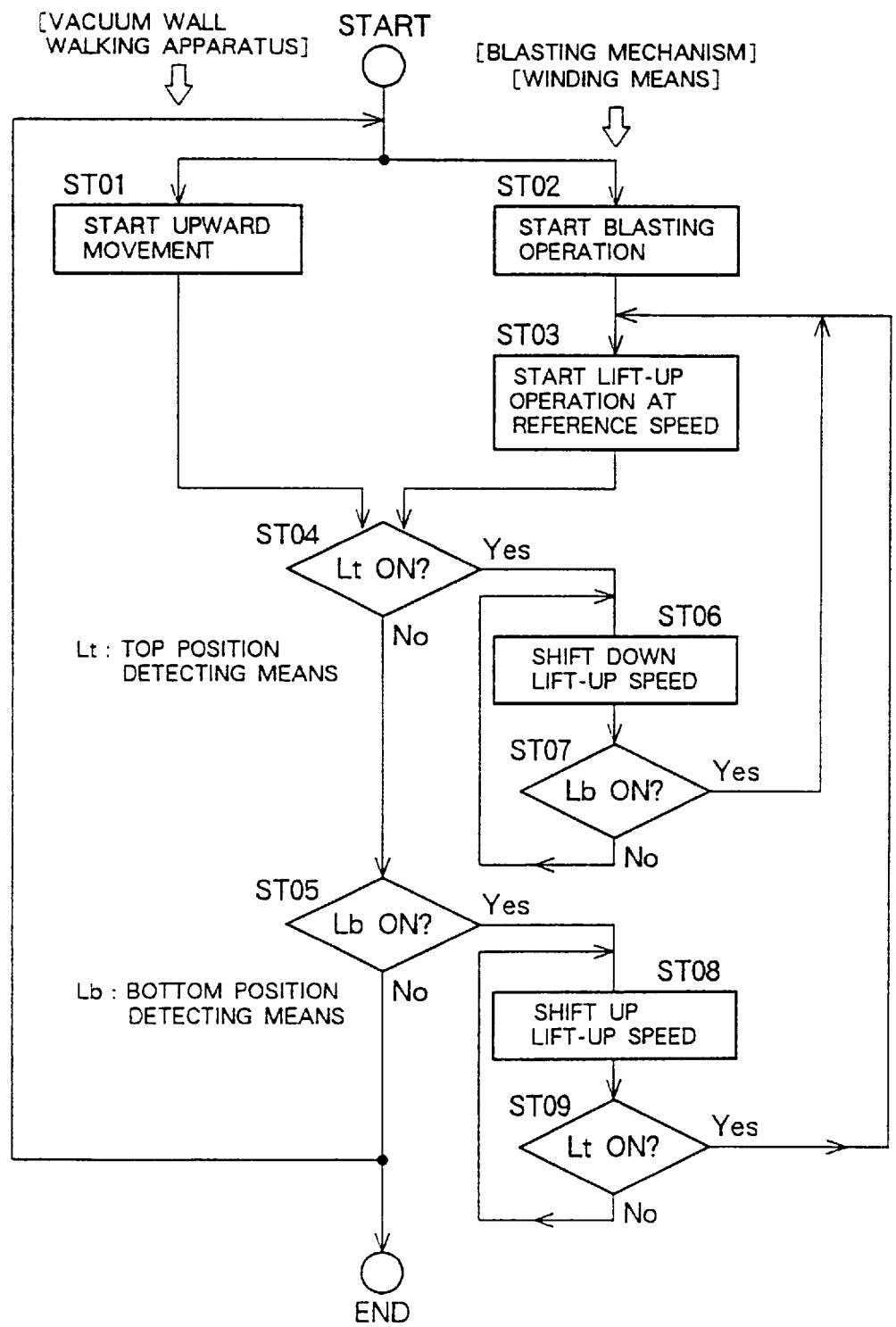
FIG. 12 is a flowchart showing the operation of the vacuum wall walking operation equipped with the surface treatment mechanism.

FIG. 12 is a flowchart of the program used in the vacuum wall walking apparatus 1 shown in FIGS. 7–9 for achieving surface treatment of the shell plate 40 shown in FIG. 11. In this embodiment, the winding means 65 is operable at three different speeds, namely, a low speed, a normal or reference speed and a high speed. In FIG. 12, reference numerals affixed with the letters "ST" represent step numbers to be executed according to a control program stored in the control unit (not shown) of the vacuum wall walking apparatus 1.

As shown in FIG. 12, a step ST01 starts the vacuum wall walking apparatus 1 moving or walking in a vertical upward direction along a wall surface (surface of the shell plate 40). At the same time, a step ST02 starts the blasting mechanism 70 blowing sand or shots against the wall surface.

Then, a step ST03 activates the winding means 65 to lift up the blasting mechanism 70 at the reference speed. The reference speed is substantially equal to an average walking speed of the vacuum wall walking apparatus 1.

Subsequently, a step ST04 makes a judgment to determine as to whether or not the top position detecting means Lt is in the detected (ON) state. Thereafter, a step ST05 makes a judgment to determine as to whether or not the bottom position detecting means Lb is in the detected (ON) state. In this instance, if both detecting means Lt and Lb are in the non-detecting (OFF) state, as shown in FIG. 8, this means that the blasting mechanism 70 is located at an intermediate position in the square space defined within the square ring-like body frame 2 of the vacuum wall walking apparatus 1. Accordingly, the control program goes on in the direction of "No" thereby continuing the walking operation of the vacuum wall walking apparatus 1, the blasting operation of the blasting mechanism 70, and the winding operation (lift-up operation in this case) of the winding means 65.

If the judgment at the step ST04 indicates the "ON" state of the top position detecting means Lt, this means that winding speed (lift-up speed in this case) is relatively greater than the walking speed of the vacuum wall walking apparatus 1. Then, a step ST06 shifts the winding speed (lift-up speed) from the reference speed down to the low speed. It may occur that as the operation continues, the winding speed falls below the walking speed. Accordingly, if a step ST07 judges the state of the bottom position detecting means Lb to be "ON" then the control program takes the route indicated by "Yes" and returns to the step ST03 in which the winding speed is returned to the reference speed.

If the judgment at the step ST05 indicates the "ON" state of the bottom position detecting means Lb, this means that the winding speed is relatively slower than the walking speed. Then, the winding speed is shifted up to the high speed at a step ST06. It may occur that the winding speed exceeds the walking speed as the operation continues. Accordingly, if a step ST09 judges the state of the top position detecting means Lt to be "ON" then the program goes on in the direction of "Yes" and returns to the step ST03 in which the winding speed is returned to the reference speed.

By virtue of the foregoing control, the upward walking motion of the vacuum wall walking apparatus 1 and the winding or lift-up speed of the blasting mechanism 70 are synchronized each other.

Although the operation has been described in conjunction with an upward movement of the vacuum wall walking apparatus 1 and the blasting mechanism 70, operation involving the downward movement of the vacuum wall walking apparatus 1 and the blasting mechanism 70 takes place in a like manner as described above. The control flow discussed above should be construed as illustrative rather than restrictive.

Figure 13:
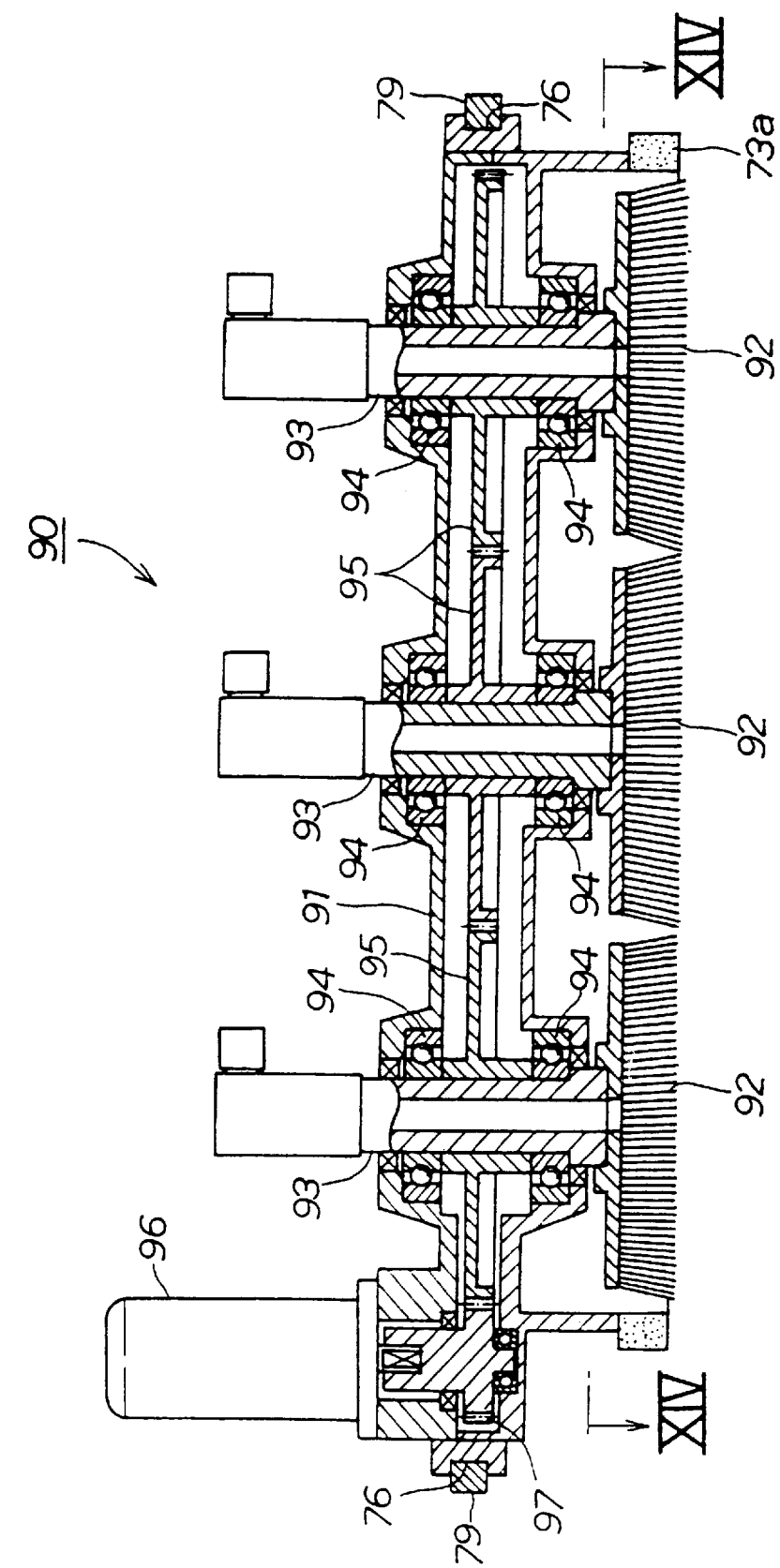
FIG. 13 is a cross-sectional view showing another form of the surface treatment mechanism according to the present invention.

FIG. 13 shows another form of the surface treatment mechanism according to the present invention. The surface treatment mechanism is composed of a rotary brush mechanism 90.

The rotary brush mechanism 90 includes an elongated hollow box 91 with a lower side open, a plurality (three in the illustrated embodiment) of brushes 92, 92, 92 disposed in close juxtaposition within the box 91 and rotatably mounted on the box 91 via respective hollow shafts 93 each journalled on the box 91 by a pair of roller bearings 94, 94, a train of three identical gears 95 fixedly mounted on the shafts 93, and a motor 96 mounted on the box 91 and having an output gear or pinion 97 held in mesh with one of the gears 95. The internal space of the hollow shafts 93 form a water passage so that water can be supplied through the water passage to the brush 92 while the brush 92 is rotating. Like the blast box 73 shown in FIG. 8, the box 91 have a pair of guide grooves 76, 76 formed at opposite ends thereof, and a pad 73 of rubber or synthetic resin attached to a lower edge of the box 91. Accordingly, the box 91 can be attached to the guide rails 79, 79 in place of the blast box 73, thereby completing a vacuum wall walking apparatus 1 equipped with the rotary brush mechanism 90.

Figure 14:
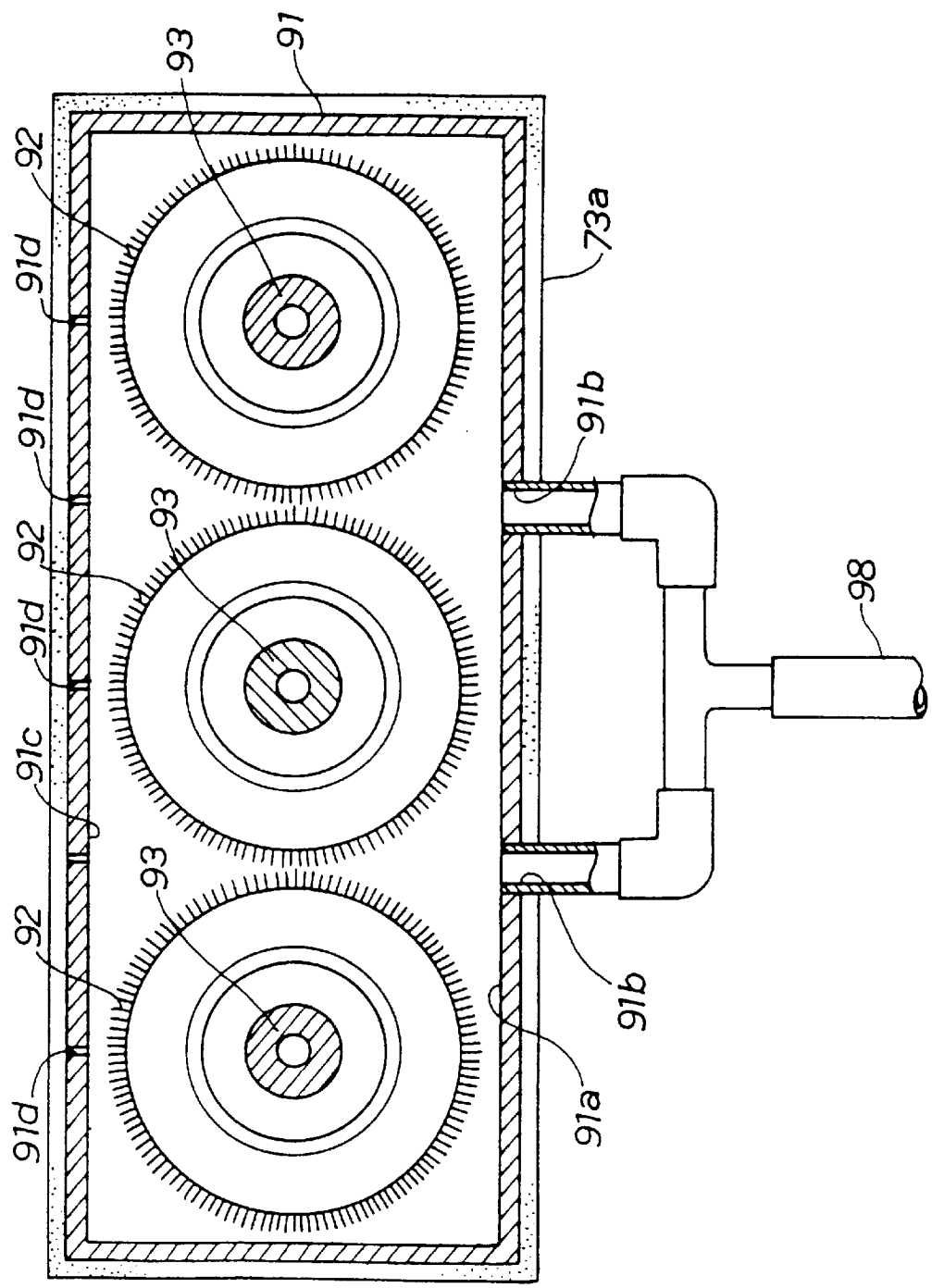
FIG. 14 is a cross-sectional view taken along the line XIV—XIV of FIG. 13.

FIG. 14, a cross section taken along the line XIV—XIV of FIG. 13, clearly illustrates an elongate hollow structure of the box 91. The box 91 has a pair of dust exhaust holes or openings 91b, 91b connected to a bifurcated end of a vacuum exhaust pipe 98, the opposite end of the pipe 98 being connected with a suitable vacuum source, such as a vacuum compressor or pump (not shown). With this construction, dust, dirt, rust and scale produced during the brushing operation are exhausted from the box 91 and collected in a suitable container (not shown). Since the vacuum means conveys or transfers a fluid and solid substances by a differential pressure, the internal space of the box 91 forms a vacuum. The vacuum formed in the box 91 is apt to hold the pad 73 in adhesion to the surface of a wall, thereby preventing movement of the box 91. To avoid this, the box 91 has an adequate number of vacuum break holes or openings 91d formed in a front wall 91c of the box 91 to allow the outside air to be drawn or introduced in the box 91, thereby reducing a suction force in the box 91 to an appropriate level.

In the rotary brush mechanism 90, the number of the brushes 92 may be two or more than four. The elongated box 73, 91 may contain a multiplicity of nozzles 74 or brushes 92 arranged in series and aligned in a direction transverse to the movement of the surface treatment mechanism 70, 90. With this arrangement, the area of surface to be treated by the surface treatment mechanism 70, 90 can be increased. In the disclosed embodiment, and more particularly as shown in FIG. 8, the position detecting means Lt and Lb are attached to the body frame 2. It is also possible according to present invention to provide the position detecting means Lt, Lb on the blasting mechanism 70 side, or alternatively they may be disposed separately on the body frame 2 and the blasting mechanism 70.

As described above, the vacuum wall walking apparatus of this invention includes an annular body frame, a plurality of leg mechanisms extending downward from the body frame, and a plurality of suction cups attached to fore ends of the respective legs. Since the body frame is composed of a flexible member, the body frame is bendable to conform to the profile of a curved surface when the vacuum wall walking apparatus is used with a wall having such curved surface. With this bending or deformation of the body frame, the suction cups are always able to retain an optimum posture relative to the curved surface to ensure that the vacuum wall walking apparatus is stably held by suction on the curved surface of the wall. The use of the flexible body frame dispenses with the need for articulated leg mechanisms provided to perform a complicated three-dimensional operation as required in the conventional apparatus. The vacuum wall walking apparatus of this invention is simple in construction, compact in size and light in weight and can be manufactured less costly.

The flexible member has a hollow float-like structure, so that a further reduction in weight of the annular base frame can be attained. In one preferred form, the flexible member is composed of a plurality of hollow elements connected together at opposite ends by a plurality of connecting fittings so as to jointly form an annular shape. The hollow elements are simple in construction and light in weight, and so the base frame can be manufactured less costly. In another preferred form, the flexible member is composed of a plurality of hollow flexible tubes bundled together. This arrangement is contributive to the reduction of the manufacturing cost.

The vacuum wall walking apparatus of this invention includes a surface treatment mechanism movably mounted thereon and movable, by a winding means, independently of the vacuum wall walking apparatus. The vacuum wall walking apparatus no longer supports any load except its own weight and, hence, a substantial reduction in size and weight of the vacuum wall walking apparatus can attained.

Since the vacuum wall walking apparatus further includes position detecting means disposed on at least one of the vacuum wall walking apparatus and the surface treatment mechanism for detecting the position of the surface treatment mechanism relative to the vacuum wall walking apparatus, the movement of the vacuum wall walking apparatus can readily be synchronized with the movement of the surface treatment mechanism.

The surface treatment mechanism of this invention includes a box having one side open to cover a portion of the surface of the wall to be treated by the surface treatment mechanism, the box having a dust exhaust port. A vacuum exhaust hose is connected at one end to the dust exhaust port for exhausting dust from an internal space of the box under suction. The vacuum wall walking apparatus having such surface treatment mechanism does not contaminate the surrounding environment and is able to perform an unmanned surface treatment operation.

The box preferably has a pad attached to the open side to provide a certain degree of airtightness to the box. The pad or the box has a vacuum break opening for allowing the outside air to be introduced into the box while a vacuum is formed in the box. By virtue of the vacuum break opening, the box is longer caught or locked by suction on the surface of the wall. In addition, the box is preferably composed of an elongate box and contains a plurality of tools arranged in series along a longitudinal axis of the elongate box for the surface treatment of the surface of the wall. The tools thus arranged are able to increase the area of surface to be treated by a single cycle of operation of the surface treatment mechanism.

Obviously, various minor changes and modifications of the present invention are possible in the light of the above teaching. It is therefore to be understood that within the scope of the appended claims the invention may be practiced otherwise than as specifically described.

What is claimed is:

1. A vacuum wall walking apparatus comprising:
   (a) a support frame defining an inner opening, wherein the support frame includes at least one flexible member arranged in a generally rectangular configuration, wherein said flexible member is composed of plurality of hollow elements connected together at opposite ends by a plurality of connecting fittings so as to jointly form an annular shape;
   (b) a plurality of leg mechanisms mounted on the support frame;
   (c) a plurality of suction cups attached to fore ends of the respective leg mechanisms; and
   (d) elastomeric means for allowing the frame to resiliently bend in general conformance to a profile defined by a curved surface traversed by the wall walking apparatus.

2. A vacuum wall walking apparatus according to claim 1, wherein the support frame is made from rubber or flexible resin.

3. A vacuum wall walking apparatus according to claim 1, wherein the support frame is resiliently bendable about first and second substantially perpendicular axes. resiliently bendable about first and second substantially perpendicular axes.

4. A vacuum wall walking apparatus comprising:
   (a) a support frame defining an inner opening, wherein the support frame includes at least one flexible member arranged in a generally rectangular configuration, wherein said flexible member is composed of a plurality of hollow flexible tubes bundled together;
   (b) a plurality of leg mechanisms mounted on the support frame;
   (c) a plurality of suction cups attached to fore ends of the respective leg mechanisms; and
   (d) elastomeric means for allowing the frame to resiliently bend in general conformance to a profile defined by a curved surface traversed by the wall walking apparatus.

5. A vacuum wall walking apparatus according to claim 4, wherein the support frame is made from rubber or flexible resin.

6. A vacuum wall walking apparatus according to claim 4, wherein the support frame is resiliently bendable about first and second substantially perpendicular axes.

7. A vacuum wall walking apparatus for walking along a surface of a wall comprising:
   a frame;
   a plurality of leg mechanisms mounted on the frame, the leg mechanisms including suction cups and means for propelling the frame along the surface of the wall;
   a surface treatment mechanism;
   means for supporting said surface treatment mechanism on said frame such that said surface treatment mechanism is movable relative to the frame in a first direction substantially parallel to the surface of the wall, and said surface treatment mechanism and said frame are relatively displaceable within a limited range of distance in a second direction substantially perpendicular to the surface of the wall; and
   winding means adapted to be installed on the wall for moving said surface treatment mechanism in said first direction independently of the movement of said frame, the winding means being adapted to support a majority of the weight of the surface treatment mechanism.

8. A vacuum wall walking apparatus according to claim 7, further including position detecting means disposed on at least one of said frame and said surface treatment mechanism for detecting said surface treatment mechanism when the position of said surface treatment mechanism deviates from a reference position on said frame.

9. A vacuum wall walking apparatus according to claim 7, wherein said supporting means includes a guide means for guiding said surface treatment mechanism while it is moving in said first direction, and a joint means interconnecting said guide means and said frame while allowing them to move relatively to one another in said second direction within said limited range of distance.

10. A vacuum wall walking apparatus according to claim 9, wherein the frame defines an inner opening, and the guide means includes at least one guide rail extending across the inner opening.

11. A vacuum wall walking apparatus according to claim 9, wherein said joint means comprises a parallel link.

12. A vacuum wall walking apparatus according to claim 9, wherein said joint means comprises an elastic joint.

13. A vacuum wall walking apparatus according to claim 7, wherein the frame defines an inner opening and is made of an elastomeric material.

14. A vacuum wall walking apparatus according to claim 13, wherein the frame is generally rectangular.

15. A vacuum wall walking apparatus according to claim 14, wherein said frame is composed of a plurality of hollow elements connected together at opposite ends by a plurality of connecting fittings.

16. A vacuum wall walking apparatus according to claim 14, wherein said frame is composed of a plurality of hollow flexible tubes bundled together.

17. A vacuum wall walking apparatus according to claim 13, wherein said frame is made from rubber or flexible resin.

18. A vacuum wall walking apparatus according to claim 13, wherein said frame is bendable at least about a central portion of the frame.

19. A vacuum wall walking apparatus according to claim 7, wherein the surface treatment mechanism includes a vacuum box having an open side configured to cover a portion of the wall being treated, and wherein said box has a pad attached to said open side to provide a certain degree of airtightness to said box, at least one of said box and said pad having a vacuum break opening for allowing the outside air to be introduced into said box while a vacuum is formed in said box.

20. A vacuum wall walking apparatus according to claim 19, wherein said pad is formed from an elastic material.

21. A vacuum wall walking apparatus according to claim 19, wherein said box is an elongate box and contains a plurality of tools arranged in series along a longitudinal axis of said elongate box for the surface treatment of the surface of the wall.

22. A vacuum wall walking apparatus according to claim 19, wherein said surface treatment mechanism is movable in a direction relative to said vacuum wall walking apparatus, said tools being aligned in a direction transverse to said direction of movement of said surface treatment mechanism.

* * * * *